B. M. MATHIAS.
MUD LUG.
APPLICATION FILED MAY 16, 1918.
1,314,087.
Patented Aug. 26, 1919.
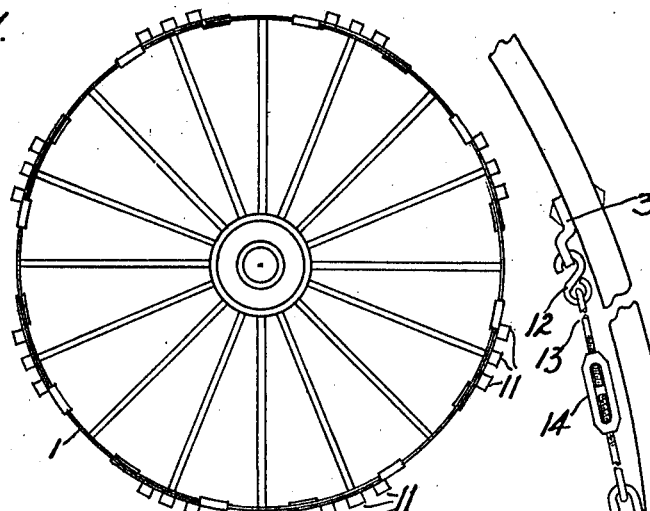
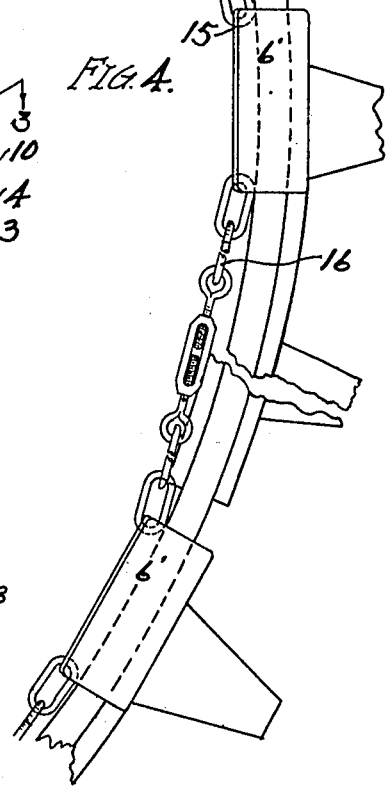
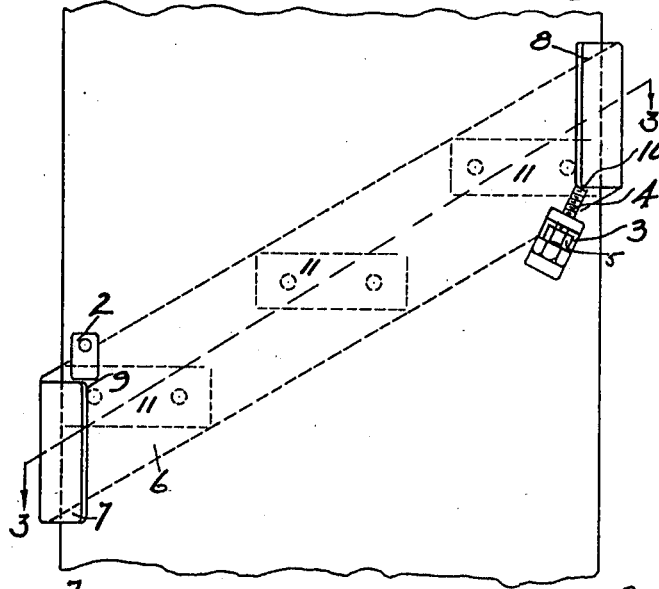
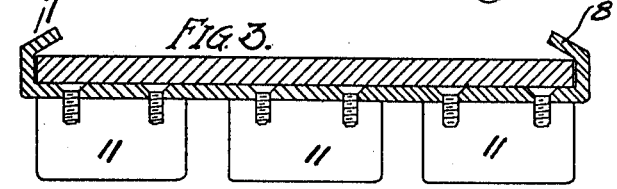
INVENTOR.
BERTON M MATHIAS
BY C. Enochs
ATTORNEY

UNITED STATES PATENT OFFICE.

BERTON M. MATHIAS, OF MINNEAPOLIS, MINNESOTA.

MUD-LUG.

1,314,087.   Specification of Letters Patent.   Patented Aug. 26, 1919.

Application filed May 16, 1918. Serial No. 235,214.

*To all whom it may concern:*

Be it known that I, BERTON M. MATHIAS, a citizen of the United States and a resident of Minneapolis, in the county of Hennepin and State of Minnesota, have invented certain new and useful Improvements in Mud-Lugs, of which the following is a specification.

One object of my invention is to provide a readily detachable form of mud lug.

Another object of my invention is to provide in a mud lug a transverse bar (for wheel rims) having multiple spuds or cleats thereon.

With these and incidental objects in view, the invention consists of certain novel features of construction and combination of parts, the essential elements of which are hereinafter described with reference to the drawings which accompany and form a part of this specification.

In the drawing Figure 1 is a side elevation of a wheel having the preferred form of my invention applied thereto, Fig. 2 is an enlarged detail of a portion of the wheel rim viewed from the inside, Fig. 3 is a section taken on the line 3—3 of Fig. 2 and Fig. 4 is an enlarged detail, shown in side elevation, of a portion of a rim embodying an alternate construction of my invention.

In the preferred construction the wheel rim has permanently attached thereto a series of angle plates 2, and a second series of angle plates 3 are provided with bolts 4 and lock nuts 5.

A series of transverse bars 6, having the ends 7 and 8 turned over as at 9 shown in Figs. 2 and 3, are so formed as to follow the contour of the wheel when applied as shown in Fig. 2.

The corner 9 is brought up snugly against a clip 2 and the end of the bolt 4 is screwed up to the corner 10 of the opposite end of the bar so as to firmly position the transverse bar on the wheel rim, and, of course, each of the series of bars may be so positioned and locked.

Carried by each of the transverse bars 6 are spuds 11, preferably three in number and arranged as shown in Fig. 2, although any suitable number and shape of spud may be used.

It is apparent that with this construction the bars 6, each carrying three of the spuds 4, may be quickly attached to or removed from the wheel rim, and the advantages of the spuds arranged in echelon formation, obtained on a single bar readily removed from the wheel.

In the construction shown in Fig. 4 I hook to the clip 3' a hook 12 suitably attached to a chain 13 including a turnbuckle 14, the opposite end of the chain engaging at 15 to a bar 6', similar to the bar 6 shown in Figs. 2 and 3.

It will be understood that with this construction the clips 2 are used on the wheel rim as shown in the preferred construction, and that the clip 3', with the chain and turnbuckle, is to replace the clip 3 and bolt 4, drawing its end of the bar 6 to a solid junction with the wheel rim instead of pushing the bar to such a junction as does the preferred construction.

By using hooks 16 between each of the bars 6' I can anchor all of the series of bars to the clip 3', or I may have any desired number of clips 3' and hook these clips, as pulling points, to each bar or to any desired number of bars at will.

While I have described my invention and illustrated it in two particular designs, I do not wish it understood that I limit myself to these constructions, as it is evident that the application of the invention may be varied in many ways within the scope of the following claims.

Claims:

1. In a device of the class shown the combination with a wheel rim, of a bar formed to be positioned diagonally across the face of said rim and having its ends formed backwardly so as to engage below said rim when positioned thereon, an anchor clip on said rim to engage one end of said bar, and an adjustable anchor means carried by said rim to position the other end of said bar.

2. In a device of the class shown the combination with a wheel rim of a diagonal transverse bar having each end formed backwardly to hook over the under side of said rim when the bar is placed thereon, an anchor clip carried by said rim and serving as a stop for one end of said bar, a second anchor clip carried by the opposite side of said rim and having engaged therewith a bolt for positioning the second end of said bar.

3. In a device of the class shown the combination with a wheel rim of a diagonal transverse bar having each end formed backwardly to hook over the under side of said rim when the bar is placed thereon, an anchor clip carried by said rim and serving as a stop for one end of said bar, a second anchor clip carried by the opposite side of said rim and having engaged therewith a bolt for positioning the second end of said bar, and multiple spuds carried by said bar.

BERTON M. MATHIAS.